(12) United States Patent
Yoshida et al.

(10) Patent No.: US 11,441,087 B2
(45) Date of Patent: Sep. 13, 2022

(54) GAS PURIFICATION DEVICE

(71) Applicant: Mitsubishi Heavy Industries Engineering, Ltd., Kanagawa (JP)

(72) Inventors: Kaori Yoshida, Tokyo (JP); Ayumu Yamazaki, Tokyo (JP); Rikio Kan, Hiroshima (JP); Seiji Kakesako, Hiroshima (JP)

(73) Assignee: Mitsubishi Heavy Industries Engineering, Ltd., Kanagawa (JP)

( * ) Notice: Subject to any disclaimer, the term of this patent is extended or adjusted under 35 U.S.C. 154(b) by 191 days.

(21) Appl. No.: 16/979,100

(22) PCT Filed: Mar. 5, 2019

(86) PCT No.: PCT/JP2019/008569
§ 371 (c)(1),
(2) Date: Sep. 8, 2020

(87) PCT Pub. No.: WO2019/176642
PCT Pub. Date: Sep. 19, 2019

(65) Prior Publication Data
US 2020/0399548 A1 Dec. 24, 2020

(30) Foreign Application Priority Data
Mar. 14, 2018 (JP) .............................. JP2018-046169

(51) Int. Cl.
*B01D 53/58* (2006.01)
*B01D 53/56* (2006.01)
(Continued)

(52) U.S. Cl.
CPC ............ *C10K 1/10* (2013.01); *B01D 53/1425* (2013.01); *B01D 53/1468* (2013.01);
(Continued)

(58) Field of Classification Search
CPC .......... B01D 2257/304; B01D 2256/20; B01D 53/1468; B01D 53/76; B01D 53/1425;
(Continued)

(56) References Cited

U.S. PATENT DOCUMENTS

2003/0108831 A1 6/2003 Harada et al.
2010/0310439 A1 12/2010 Brok et al.
(Continued)

FOREIGN PATENT DOCUMENTS

JP 2000-290668 A 10/2000
JP 2003-130326 A 5/2003
(Continued)

OTHER PUBLICATIONS

The Office Action dated Nov. 25, 2020, issued in counterpart IN application No. 202017035063.
(Continued)

*Primary Examiner* — Timothy C Vanoy
(74) *Attorney, Agent, or Firm* — Osha Bergman Watanabe & Burton LLP

(57) ABSTRACT

A gas purification device removes a part of ammonia contained in a first gas; recovers a first off-gas containing the removed ammonia, removes hydrogen sulfide and ammonia from a second gas produced by removing the part of ammonia, recovers a second off-gas containing the removed hydrogen sulfide and ammonia, and combusts the first off-gas and the second off-gas. The gas purification device includes: a first combustion chamber in which combustion is performed in a reducing atmosphere; a second combustion chamber in which combustion is performed in a reducing atmosphere downstream of the first combustion chamber; and a third combustion chamber in which combustion is performed in an oxidizing atmosphere downstream of the second combustion chamber. The first off-gas flows into the (Continued)

first combustion chamber and the second off-gas flows into the third combustion chamber.

6 Claims, 5 Drawing Sheets

(51) Int. Cl.

| | | |
|---|---|---|
| *B01D 53/75* | (2006.01) | |
| *B01D 53/76* | (2006.01) | |
| *B01D 53/18* | (2006.01) | |
| *B01D 53/14* | (2006.01) | |
| *B01D 53/52* | (2006.01) | |
| *C10J 3/82* | (2006.01) | |
| *C01B 3/52* | (2006.01) | |
| *C01B 3/02* | (2006.01) | |
| *C10K 1/10* | (2006.01) | |
| *F23G 7/06* | (2006.01) | |

(52) U.S. Cl.
CPC ............. *B01D 53/18* (2013.01); *B01D 53/52* (2013.01); *B01D 53/56* (2013.01); *B01D 53/58* (2013.01); *B01D 53/75* (2013.01); *B01D 53/76* (2013.01); *C01B 3/02* (2013.01); *C01B 3/52* (2013.01); *C10J 3/82* (2013.01); *F23G 7/06* (2013.01); *B01D 2252/204* (2013.01); *C01B 2203/0415* (2013.01); *C01B 2203/0485* (2013.01); *C10J 2300/1618* (2013.01)

(58) Field of Classification Search
CPC .. B01D 2252/204; B01D 53/56; B01D 53/58; B01D 2252/103; B01D 53/1418; B01D 53/52; B01D 2256/16; B01D 53/1406; B01D 2257/406; C01B 2203/0485; C01B 3/52; C01B 2203/0415; C10J 2300/1618; C10J 3/82; C10K 1/101; C10K 1/34; C10K 1/004; C10K 1/006; C10K 1/10; Y02E 20/16; Y02E 20/18; Y02P 20/129; F23G 7/06
See application file for complete search history.

(56) References Cited

U.S. PATENT DOCUMENTS

| | | |
|---|---|---|
| 2011/0020203 A1 | 1/2011 | Eksilioglu et al. |
| 2021/0025588 A1 | 1/2021 | Yoshida |

FOREIGN PATENT DOCUMENTS

| | | |
|---|---|---|
| JP | 2004-036983 A | 2/2004 |
| JP | 3924150 B2 | 6/2007 |
| JP | 4475697 B2 | 6/2010 |
| JP | 2010-536573 A | 12/2010 |
| JP | 5559067 B2 | 7/2014 |
| WO | 2019-069519 A1 | 4/2019 |

OTHER PUBLICATIONS

The extended European Search Report dated Feb. 26, 2021, issued to the corresponding EP application No. 19767873.3 (6 pages).

GAS PURIFICATION DEVICE

TECHNICAL FIELD

The present disclosure relates to a gas purification device.

BACKGROUND

In an integrated coal gasification combined cycle power plant, a syngas obtained by gasification of coal is purified by removing ammonia ($NH_3$) by an ammonia removal part, for example, a washing column, and then removing hydrogen sulfide ($H_2S$) by a hydrogen sulfide absorption column using an amine aqueous solution. Patent Documents 1 and 2 describe that $NH_3$ removed in the washing column can be obtained as an off-gas by a stripper, and is burned by a combustion device in a reducing atmosphere, while $H_2S$ removed in the hydrogen sulfide absorption column is burned as an off-gas by a combustion device in an oxidizing atmosphere.

CITATION LIST

Patent Literature

Patent Document 1: JP3924150B
Patent Document 2: JP2004-36983A

SUMMARY

Problems to be Solved

However, in the gas purification device disclosed in Patent Documents 1 and 2, since $NH_3$ is removed only by the washing column, it is assumed that $NH_3$ is completely removed in the washing column. In this case, the height of the washing column is high (the size of the ammonia removal unit is large), so that the cost of the gas purification device increases. If $NH_3$ is not completely removed in the washing column, remaining $NH_3$ flows into the hydrogen sulfide absorption column and is recovered by an amine aqueous solution together with $H_2S$ as an off-gas. In this case, a facility for processing a mixed gas of $H_2S$ and $NH_3$ is necessary, so that the cost of the gas purification device increases.

In view of the above, an object of at least one embodiment of the present disclosure is to provide a gas purification device that can reduce the size of a ammonia removal unit.

Solution to the Problems

A gas purification device according to at least one embodiment of the present invention is a gas purification device for purifying a first gas containing ammonia and hydrogen sulfide, comprising: an ammonia removal part configured to remove a part of ammonia contained in the first gas from the first gas; a first off-gas recovery part configured to recover a first off-gas containing ammonia removed by the ammonia removal part; a hydrogen sulfide/ammonia removal part configured to remove hydrogen sulfide and ammonia from a second gas produced by removing the part of ammonia by the ammonia removal part; a second off-gas recovery part configured to recover a second off-gas containing hydrogen sulfide and ammonia removed by the hydrogen sulfide/ammonia removal part; and a combustion part configured to combust the first off-gas and the second off-gas. The combustion part includes: a first combustion chamber in which combustion is performed in a reducing atmosphere; a second combustion chamber in which combustion is performed in a reducing atmosphere downstream of the first combustion chamber; and a third combustion chamber in which combustion is performed in an oxidizing atmosphere downstream of the second combustion chamber. The gas purification is configured such that the first off-gas flows into the first combustion chamber, and the second off-gas flows into the third combustion chamber.

With this configuration, even when $NH_3$ is not completely removed from the first gas by the ammonia removal part, $NH_3$ remaining in the second gas can be treated together with $H_2S$ by the combustion part. Thus, by reducing the $NH_3$ removal rate in the ammonia removal part, it is possible to downsize the ammonia removal part.

In some embodiments, the second gas may contain 2 ppm or more of ammonia. $NH_3$ not removed by the ammonia removal part and remaining in the second gas is contained in the second off-gas and combusted in the oxidizing atmosphere in the third combustion chamber. As a result, combustion of $NH_3$ produces nitrogen oxide (NOx). However, when the concentration of $NH_3$ remaining in the second gas is 2 ppm or more, the producing amount of NOx derived from $NH_3$ remaining in the ammonia removal part can be reduced as much as possible. Thus, it is possible to downsize the ammonia removal part while suppressing an increase in NOx.

In some embodiments, a removal rate of removing ammonia from the first gas may be 98% or less. When the removal rate is close to 100%, the size of the ammonia removal part dramatically increases with an increase in removal rate. Thus, when the removal rate of removing $NH_3$ from the first gas is 98% or less, it is possible to downsize the ammonia removal part while reducing the producing amount of NOx derived from $NH_3$ remaining in the ammonia removal part.

In some embodiments, a part of the second off-gas may flow into the second combustion chamber. With this configuration, in the second combustion chamber, since $NH_3$ is combusted in the reducing atmosphere, NOx is hardly produced. Thus, $NH_3$ combusted in the third combustion chamber is reduced, so that it is possible to downsize the ammonia removal part while further reducing the producing amount of NOx derived from $NH_3$ remaining in the ammonia removal part.

In some embodiments, the gas purification device may further comprise a denitration part configured to denitrate a flue gas flowing out of the third combustion chamber. With this configuration, even when NOx is produced by combustion of $NH_3$ in the third combustion chamber, at least a part of $NH_3$ is decomposed by the denitration part into nitrogen and water, so that the total amount of NOx flowing out of the gas purification device is reduced. Accordingly, it is possible to downsize the ammonia removal part while further reducing the producing amount of NOx derived from $NH_3$ remaining in the ammonia removal part.

In some embodiments, the gas purification device may further comprise a converter configured to hydrolyze hydrogen cyanide and carbonyl sulfide contained in a syngas obtained by gasification of coal to produce the first gas. With this configuration, in an integrated coal gasification combined cycle power plant, it is possible to downsize the ammonia removal part.

Advantageous Effects

According to at least one embodiment of the present disclosure, even when $NH_3$ is not completely removed from the first gas by the ammonia removal part, $NH_3$ remaining in the second gas can be treated together with $H_2S$ by the combustion part. Thus, by reducing the $NH_3$ removal rate in the ammonia removal part, it is possible to downsize the ammonia removal part.

DETAILED DESCRIPTION

Embodiments of the present invention will now be described in detail with reference to the accompanying drawings. However, the scope of the present invention is not limited to the following embodiments. It is intended that dimensions, materials, shapes, relative positions and the like of components described in the embodiments shall be interpreted as illustrative only and not intended to limit the scope of the present invention.

First Embodiment

Figure 1:
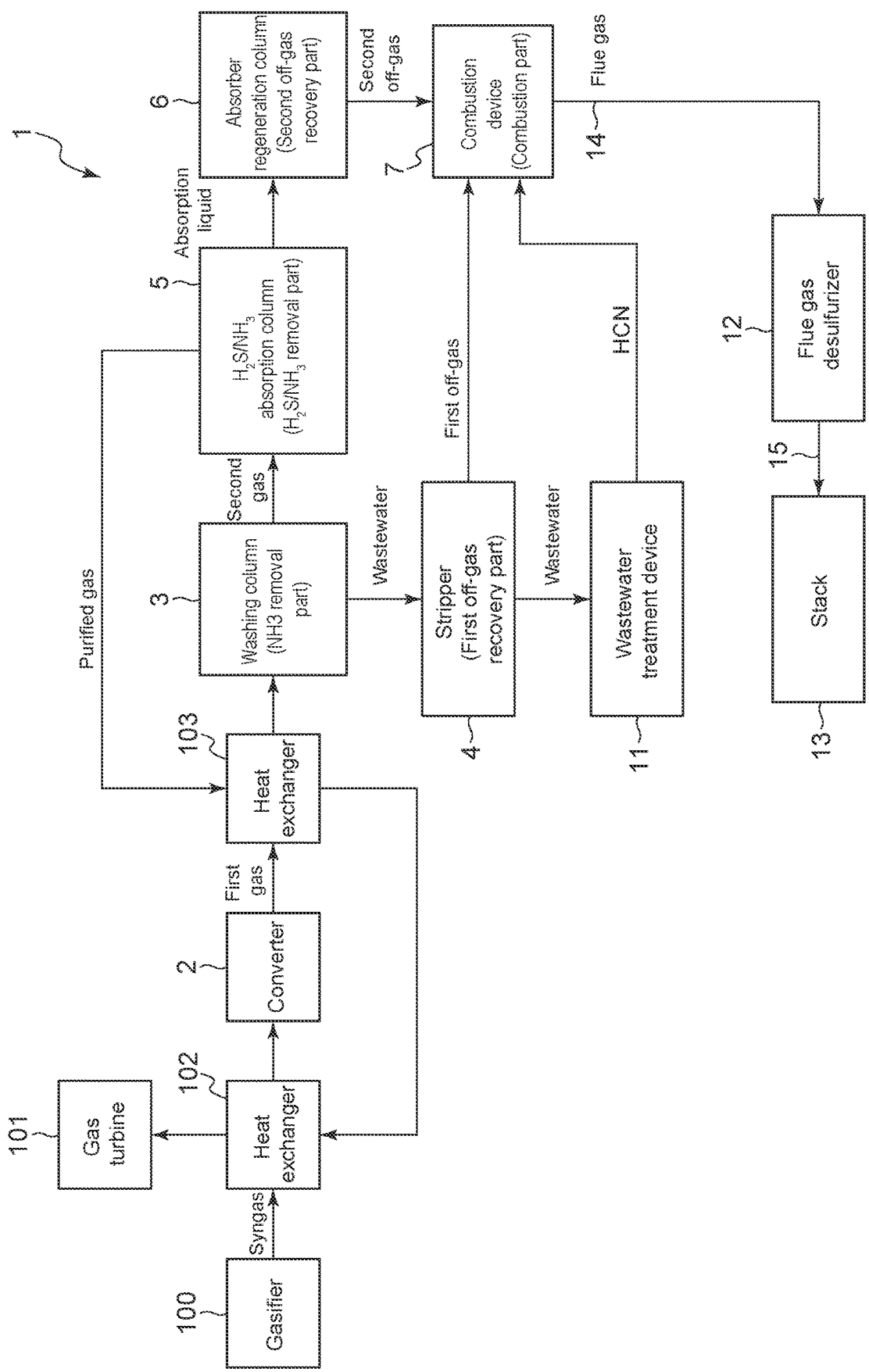
FIG. 1 is a schematic configuration diagram of a gas purification device according to a first embodiment of the present disclosure.

FIG. 1 shows a gas purification device 1 according to a first embodiment of the present disclosure. The gas purification device 1 is a device for purifying a syngas obtained by gasification of coal in a gasifier 100 of an integrated coal gasification combined cycle power plant. More specifically, the gas purification device 1 is a device for removing $H_2S$ and $NH_3$ from a first gas containing $H_2S$ and $NH_3$ produced by hydrolysis of carbonyl sulfide (COS) and hydrogen cyanide (HCN) in a converter 2 packed with a catalyst for hydrolyzing both COS and HCN contained in the syngas.

The gas purification device 1 includes a washing column 3 which is an ammonia removal part configured to remove a part of $NH_3$ from a first gas, a stripper 4 which is a first off-gas recovery part configured to recover a first off-gas containing $NH_3$ by gas-liquid separation of wastewater dissolving $NH_3$ removed by the washing column 3, a hydrogen sulfide/ammonia absorption column 5 which is a hydrogen sulfide/ammonia removal part configured to cause $H_2S$ and $NH_3$ to be absorbed in an absorption liquid such as an amine aqueous solution to remove $H_2S$ and $NH_3$ from a second gas produced by removing the part of $NH_3$ from the first gas by the washing column 3, an absorber regeneration column 6 which is a second off-gas recovery part configured to recovery a second off-gas containing $H_2S$ and $NH_3$ absorbed in the absorption liquid, and a combustion device 7 which is a combustion part configured to combust the first off-gas and the second off-gas. Since the gas purification device 1 according to the first embodiment is a device for purifying a syngas obtained by gasification of coal in the gasifier 100 of the integrated coal gasification combined cycle power plant, the gas purification device 1 also includes the converter 2.

The gas purification device 1 may further include a wastewater treatment device 11 for treating wastewater that has been subjected to gas-liquid separation in the stripper 4. The wastewater treatment device 11 is configured to separate HCN that has not been converted in the converter 2 from the wastewater discharged from the stripper 4, and supply the HCN to the combustion device 7. The combustion device 7 communicates with a flue gas desulfurizer 12 for desulfurizing flue gas of the combustion device 7 via a pipe 14. The flue gas desulfurizer 12 communicates with a stack 13 via a pipe 15.

To heat a purified gas obtained by purifying the syngas from the gasifier 100 by the gas purification device 1 and flowing out of the hydrogen sulfide/ammonia absorption column 5, a heat exchanger 102 may be disposed between the gasifier 100 and the converter 2, and a heat exchanger 103 may be disposed between the converter 2 and the washing column 3. The purified gas heated in the heat exchangers 102 and 103 is sent to a gas turbine 101 of the integrated coal gasification combined cycle power plant.

Figure 2:
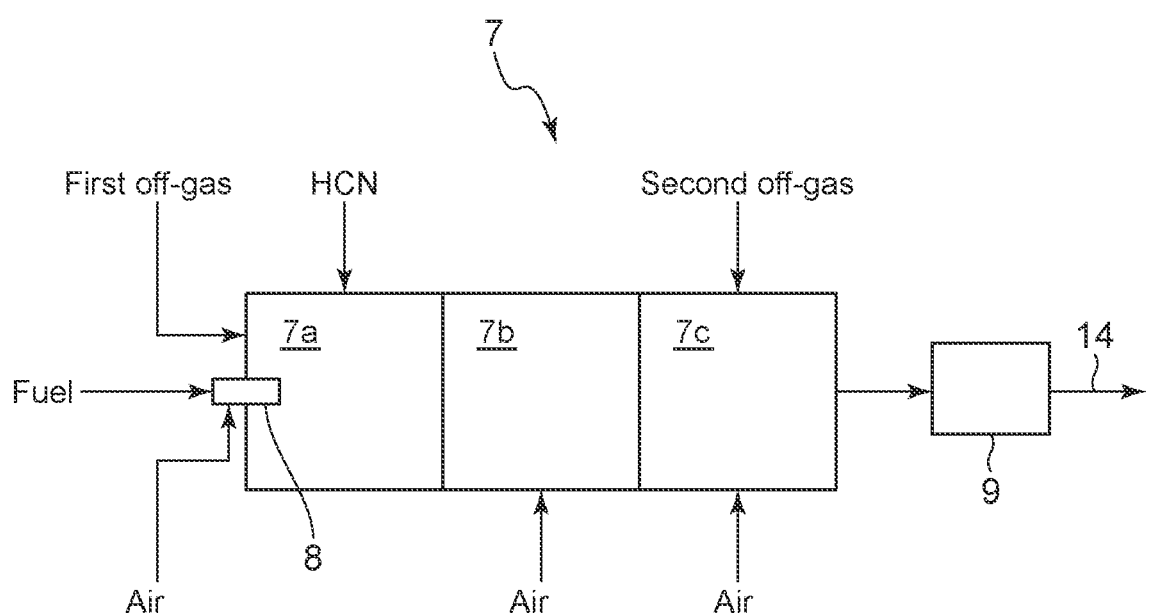
FIG. 2 is a schematic configuration diagram of a combustion part of the gas purification device according to the first embodiment of the present disclosure.

As shown in FIG. 2, the combustion device 7 is divided into a first combustion chamber 7a, a second combustion chamber 7b, and a third combustion chamber 7c from upstream to downstream. The first combustion chamber 7a has a burner 8. The burner 8 is configured to be supplied with fuel and air. Further, the first combustion chamber 7a is configured to be supplied with the first off-gas from the stripper 4 (see FIG. 1) and HCN from the wastewater treatment device 11 (see FIG. 1). The second combustion chamber 7b is configured to be supplied with air. The third combustion chamber 7c is configured to be supplied with air and the second off-gas from the absorber regeneration column 6 (see FIG. 1). The third combustion chamber 7c communicates with an exhaust heat boiler 9, and the exhaust heat boiler 9 communicates with the flue gas desulfurizer 12 (see FIG. 1).

Next, operation of the gas purification device 1 according to the first embodiment will be described.

As shown in FIG. 1, the syngas from the gasifier 100 is cooled by heat exchange with the purified gas in the heat exchanger 102 and flows into the converter 2. In the converter 2, COS and HCN in the syngas is hydrolyzed by the catalyst, so that the first gas containing $H_2S$ and $NH_3$ flows out of the converter 2. The first gas flowing out of the converter 2 exchanges heat with the purified gas in the downstream heat exchanger 103 to be cooled, and flows into the washing column 3.

In the washing column 3, the first gas is cooled by contact with water, and $NH_3$ in the first gas is absorbed in water to remove $NH_3$ from the first gas. At this time, $NH_3$ is not completely but partially removed from the first gas. The concentration of $NH_3$ remaining in the second gas flowing out of the washing column 3 is 2 ppm or more, preferably 5 ppm or more, more preferably 10 ppm or more, most preferably 10 to 50 ppm. Since $NH_3$ is not completely removed in the washing column 3, it is possible to downsize the ammonia removal part, i.e., it is possible to reduce the height of the washing column 3. The effect will now be described.

Figure 3:
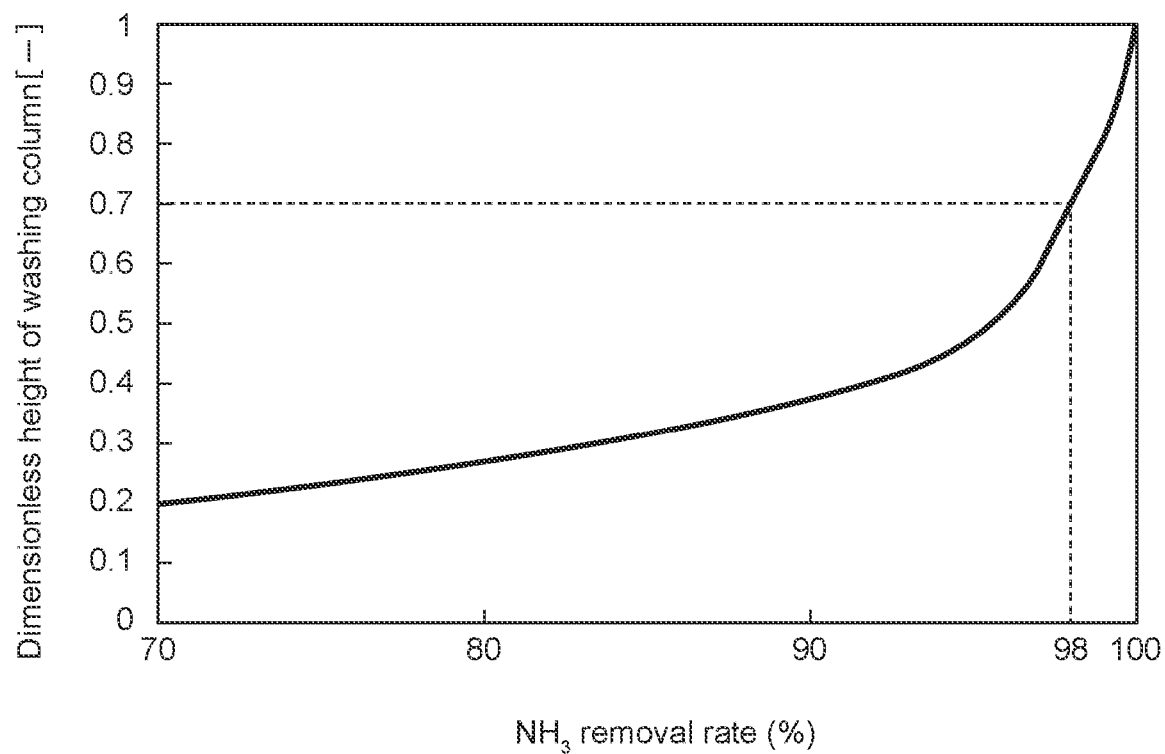
FIG. 3 is a graph schematically showing a relationship between height of the washing column and $NH_3$ removal rate in the washing column of the gas purification device according to the first embodiment of the present disclosure.

FIG. 3 schematically shows a relationship between height of the washing column 3 and $NH_3$ removal rate in the washing column 3. The $NH_3$ removal rate in the horizontal axis of FIG. 3 is a ratio of the amount of $NH_3$ contained in wastewater flowing out of the washing column 3 to the amount of $NH_3$ flowing into the washing column 3. The dimensionless height of the washing column 3 in the vertical axis of FIG. 3 is a ratio of the height of the washing column necessary for obtaining a certain $NH_3$ removal rate to the height of the washing column 3 necessary for obtaining 100% $NH_3$ removal rate. When the $NH_3$ removal rate is in a range of 95 to 100%, the dimensionless height of the washing column 3 dramatically increases with an increase in $NH_3$ removal rate, as compared with when the $NH_3$ removal rate is below the range. Thus, by slightly decreasing the $NH_3$ removal rate from 100%, it is possible to dramatically reduce the height of the washing column 3. For instance, when the $NH_3$ removal rate is 98% or less, the height of the washing column 3 can be reduced to 70% or less compared with the case where the $NH_3$ removal rate is 100%, so that it is possible to reduce the cost of the gas purification device 1. As described above, since the height of the washing column 3 is correlated to the $NH_3$ removal rate in the washing column 3, the height of the washing column 3 may be designed in consideration of $NH_3$ treatment performance or the like in a facility downstream of the washing column 3 in the gas purification device 1.

As shown in FIG. 1, water absorbing $NH_3$ in the washing column 3 flows out of the washing column 3 as wastewater into the stripper 4. In the stripper 4, the wastewater is subjected to gas-liquid separation, so that the first off-gas containing $NH_3$ and the wastewater from which $NH_3$ has been removed are discharged from the stripper 4. The first off-gas is sent to the combustion device 7, and the wastewater is sent to the wastewater treatment device 11. In the wastewater treatment device 11, HCN remaining in the wastewater is separated and sent to the combustion device 7.

The second gas produced by removing $NH_3$ from the first gas in the washing column 3 flows out of the washing column 3 into the hydrogen sulfide/ammonia absorption column 5. In the hydrogen sulfide/ammonia absorption column 5, the second gas comes into contact with the absorption liquid so that $H_2S$ and $NH_3$ in the second gas are dissolved in the absorption liquid to remove $H_2S$ and $NH_3$ from the second gas. The purified gas produced by removing $H_2S$ and $NH_3$ from the second gas flows out of the hydrogen sulfide/ammonia absorption column 5 and is heated by heat exchange with the first gas and with the syngas in the heat exchangers 103 and 102, respectively, and flows into the gas turbine 101.

The absorption liquid having absorbed $H_2S$ and $NH_3$ in the hydrogen sulfide/ammonia absorption column 5 is heated in the absorber regeneration column 6 to eliminate $H_2S$ and regenerate the absorption liquid. $H_2S$ eliminated from the absorption liquid is recovered so as to be contained in the second off-gas, and the second off-gas is sent to the combustion device 7.

As shown in FIG. 2, in the first combustion chamber 7a of the combustion device 7, fuel and air are introduced through the burner 8 and combusted in a reducing atmosphere. Since the first combustion chamber 7a is supplied with the first off-gas containing $NH_3$ and HCN from the wastewater treatment device 11 (see FIG. 1), $NH_3$ is combusted in the reducing atmosphere and converted into nitrogen and water, while HCN is combusted in the reducing atmosphere and converted into nitrogen, water and carbon dioxide.

Meanwhile, in the third combustion chamber 7c, combustion is performed in an oxidizing atmosphere. Since the third combustion chamber 7c is supplied with the second off-gas containing $H_2S$ and $NH_3$, $H_2S$ is combusted in the oxidizing atmosphere and converted into sulfur dioxide and water, while $NH_3$ is combusted in the oxidizing atmosphere and converted into NOx and water. $NH_3$ contained in the second off-gas is $NH_3$ remaining in the second gas since $NH_3$ is not completely removed in the washing column 3 (see FIG. 1) as described above. In the gas purification device 1, even when $NH_3$ is not completely removed in the washing column 3, $NH_3$ remaining in the second gas in the washing column 3 can be removed by combustion in the combustion device 7.

However, when $NH_3$ remaining in the second gas in the washing column 3 is removed by combustion in the combustion device 7, NOx is produced as a result of combustion of $NH_3$ in the oxidizing atmosphere. In the first embodiment, since the concentration of $NH_3$ remaining in the second gas is approximately 2 ppm or more, it is possible to reduce the producing amount of NOx derived from $NH_3$ remaining in the second gas in the washing column 3 as much as possible. Thus, it is possible to reduce the height of the washing column 3 while suppressing an increase in NOx.

The flue gas of the combustion device 7 is cooled in the exhaust heat boiler 9 and then flows through the pipe 14. As shown in FIG. 1, after passing through the pipe 14, the flue gas is desulfurized in the flue gas desulfurizer. The desulfurized flue gas flows through the pipe 15 and is then emitted to the atmosphere through the stack 13.

As described above, even when $NH_3$ is not completely removed from the first gas in the washing column 3, $NH_3$ remaining in the second gas can be treated together with $H_2S$ by the combustion device 7. Thus, by reducing the $NH_3$ removal rate in the washing column 3, it is possible to reduce the height of the washing column 3. As a result, it is possible to reduce the cost of the gas purification device 1.

Second Embodiment

Next, a gas purification device according to the second embodiment will be described. The gas purification device according to the second embodiment is different from the first embodiment in that the second off-gas treatment form is modified. In the second embodiment, the same constituent elements as those in the first embodiment are associated with the same reference numerals and not described again in detail.

Figure 4:
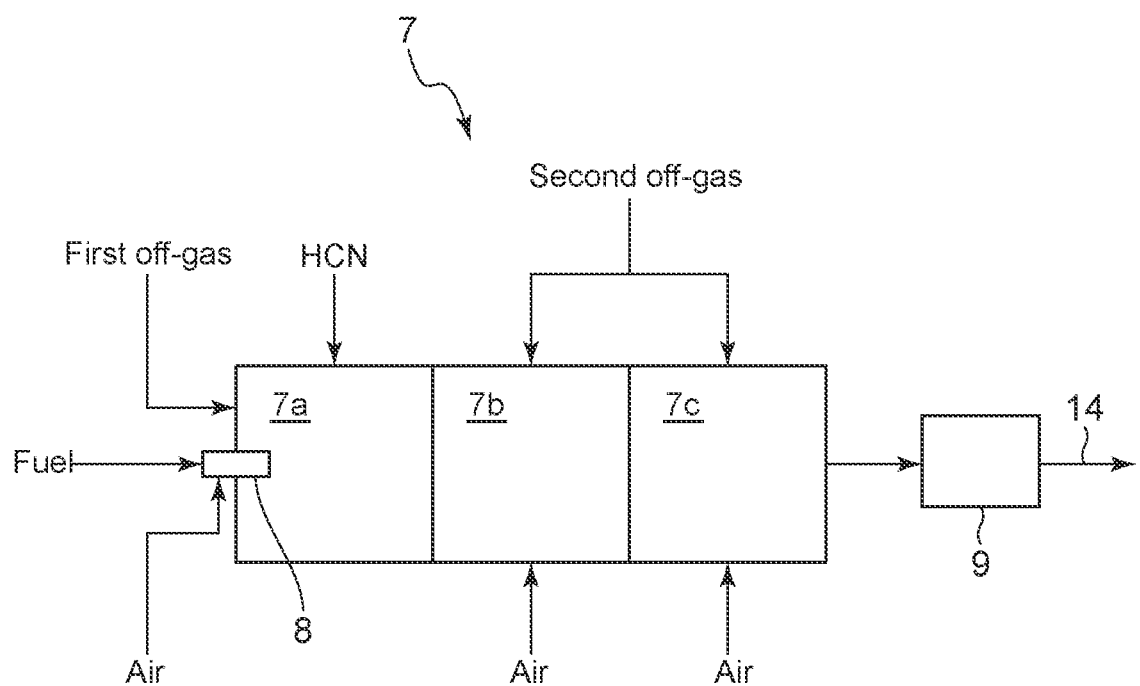
FIG. 4 is a schematic configuration diagram of a combustion part of a gas purification device according to a second embodiment of the present disclosure.

As shown in FIG. 4, this device is configured such that a part of the second off-gas flows into the second combustion chamber 7b and the remainder of the second off-gas flows into the third combustion chamber 7c. The configuration is otherwise the same as that of the first embodiment.

In the second combustion chamber 7b, since $NH_3$ is combusted in the reducing atmosphere, NOx is hardly produced. Accordingly, $NH_3$ combusted in the third combustion chamber 7c is reduced, so that it is possible to reduce the height of the washing column 3 while further suppressing an increase in producing amount of NOx derived from $NH_3$ remaining in the washing column 3, compared with the first embodiment.

Third Embodiment

Next, a gas purification device according to the third embodiment will be described. The gas purification device according to the third embodiment additionally includes a denitration part configured to denitrate the flue gas, with respect to the first and second embodiments. In the following, the third embodiment will be described in conjunction with the case where a denitration part is added to the configuration of the first embodiment, but the third embodiment may be configured by adding a denitration part to the configuration of the second embodiment. In the third embodiment, the same constituent elements as those in the first embodiment are associated with the same reference numerals and not described again in detail.

Figure 5:
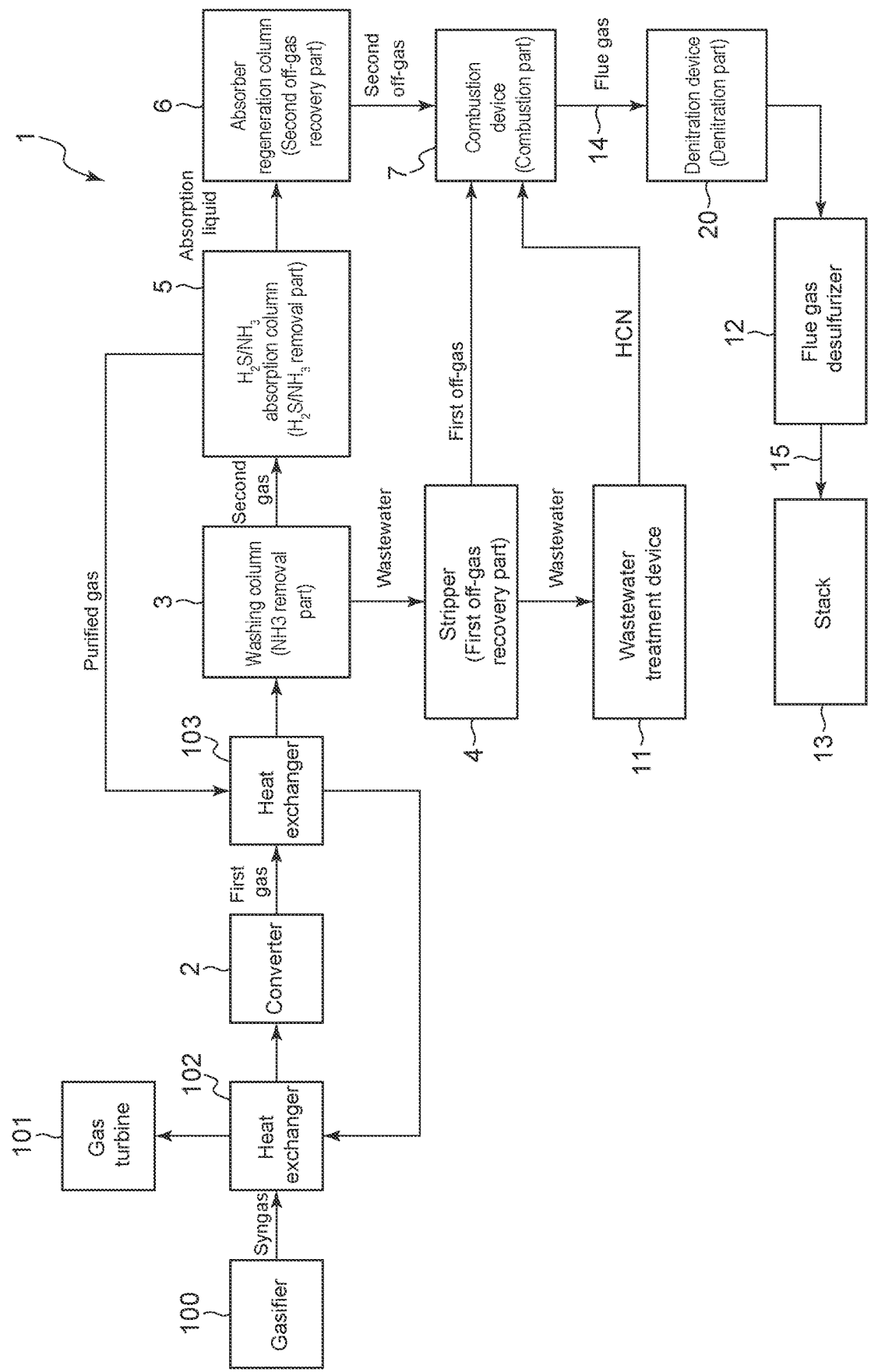
FIG. 5 is a schematic configuration diagram of a gas purification device according to a third embodiment of the present disclosure.

As shown in FIG. 5, the pipe 14 is provided with a denitration device 20 which is a denitration part for denitrating the flue gas from the combustion device 7. The denitration device 20 is packed with a known catalyst for hydrolyzing NOx into nitrogen and water. The configuration is otherwise the same as that of the first embodiment.

As described in the first embodiment, combustion of $NH_3$ in the third combustion chamber 7c (see FIG. 2) produces NOx. However, in the third embodiment, since at least a part of NOx contained in the flue gas is decomposed into nitrogen and water in the denitration device 20, the total amount of NOx flowing out of the gas purification device 1 is reduced. Accordingly, it is possible to reduce the height of the washing column 3 while further suppressing an increase in producing amount of NOx derived from $NH_3$ remaining in the washing column 3.

In the first to third embodiments, the gas purification device 1 has been described as a part of the integrated coal gasification combined cycle power plant, but the embodiments are not limited thereto. The gas purification device 1 can be provided in any facility. In this case, the gas purification device 1 may not necessarily include the converter 2. The gas purification device 1 may be a device for purifying the first gas (gas containing $H_2S$ and $NH_3$) discharged from any facility.

REFERENCE SIGNS LIST

1 Gas purification device
2 Converter
3 Washing column (Ammonia removal part)
4 Stripper (First off-gas recovery part)
5 Hydrogen sulfide/ammonia absorption column (Hydrogen sulfide/ammonia removal part)
6 Absorber regeneration column (Second off-gas recovery part)
7 Combustion device (Combustion part)
7a First combustion chamber
7b Second combustion chamber
7c Third combustion chamber
8 Burner
9 Exhaust heat boiler
11 Wastewater treatment device
12 Flue gas desulfurizer
13 Stack
14 Pipe
15 Pipe
20 Denitration device (Denitration part)
100 Gasifier
101 Gas turbine
102 Heat exchanger
103 Heat exchanger

The invention claimed is:

1. A gas purification device for purifying a first gas containing ammonia and hydrogen sulfide, comprising:
   an ammonia removal part configured to remove a part of ammonia contained in the first gas from the first gas;
   a first off-gas recovery part configured to recover a first off-gas containing ammonia removed by the ammonia removal part;
   a hydrogen sulfide/ammonia removal part configured to remove hydrogen sulfide and ammonia from a second gas produced by removing the part of ammonia by the ammonia removal part;
   a second off-gas recovery part configured to recover a second off-gas containing hydrogen sulfide and ammonia removed by the hydrogen sulfide/ammonia removal part; and
   a combustion part configured to combust the first off-gas and the second off-gas,
   wherein the combustion part includes:
     a first combustion chamber in which combustion is performed in a reducing atmosphere;
     a second combustion chamber in which combustion is performed in a reducing atmosphere downstream of the first combustion chamber; and
     a third combustion chamber in which combustion is performed in an oxidizing atmosphere downstream of the second combustion chamber, and
   wherein the gas purification is configured such that the first off-gas flows into the first combustion chamber, and the second off-gas flows into the third combustion chamber.

2. The gas purification device according to claim 1, wherein the second gas contains 2 ppm or more of ammonia.

3. The gas purification device according to claim 1, wherein a removal rate of removing ammonia from the first gas is 98% or less.

4. The gas purification device according to claim 1, wherein a part of the second off-gas flows into the second combustion chamber.

5. The gas purification device according to claim 1, further comprising a denitration part configured to denitrate a flue gas flowing out of the third combustion chamber.

6. The gas purification device according to claim 1, further comprising a converter configured to hydrolyze hydrogen cyanide and carbonyl sulfide contained in a syngas obtained by gasification of coal to produce the first gas.

* * * * *